United States Patent
Subramanian et al.

(10) Patent No.: US 11,762,857 B2
(45) Date of Patent: Sep. 19, 2023

(54) METHODS AND SYSTEMS FOR SEARCHING DATA EXCHANGES THAT COMPRISE INFORMATION ON ASSETS WITH NON-HOMOGENOUS FUNCTIONALITY AND NON-STANDARDIZED DATA DESCRIPTIONS

(71) Applicant: Capital One Services, LLC, McLean, VA (US)

(72) Inventors: Singaram Subramanian, Dublin, CA (US); Sumod Soman, San Ramon, CA (US); Adwait Suresh Talathi, Kensington, CA (US); Jonathan Rodriguez, Richmond, VA (US); Sheel Khanna, Glen Allen, VA (US); Snehal Patil, San Ramon, CA (US); Heena Patel, Fremont, CA (US); Naveen Chandran, San Ramon, CA (US); John Prout, Castro Valley, CA (US); Tribhuvan Kambham, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 29 days.

(21) Appl. No.: 17/676,076

(22) Filed: Feb. 18, 2022

(65) Prior Publication Data
US 2023/0267122 A1    Aug. 24, 2023

(51) Int. Cl.
G06F 16/2455    (2019.01)
(52) U.S. Cl.
CPC ................ *G06F 16/2455* (2019.01)

(58) Field of Classification Search
CPC .................................................. G06F 16/2455
USPC .......................................................... 707/769
See application file for complete search history.

(56) References Cited

U.S. PATENT DOCUMENTS

| | | | | |
|---|---|---|---|---|
| 7,711,703 B2* | 5/2010 | Smolen | ............... | G06F 16/2308 |
| | | | | 707/948 |
| 7,747,480 B1* | 6/2010 | Agresta | ................... | G06Q 10/06 |
| | | | | 705/28 |
| 7,783,596 B2* | 8/2010 | Smolen | ............... | G06F 16/2308 |
| | | | | 707/661 |
| 11,023,218 B1* | 6/2021 | Lu | ......................... | G06F 21/577 |
| 11,620,282 B2* | 4/2023 | Yurtsev | ............... | G06F 16/2455 |
| | | | | 707/722 |

(Continued)

*Primary Examiner* — Hanh B Thai
(74) *Attorney, Agent, or Firm* — Perkins Coie LLP

(57) ABSTRACT

Methods and systems searching data exchanges and assets with non-homogenous functionality and non-standardized data descriptions using credentials corresponding to users. The method includes receiving, from a user, a request to access a data exchange, retrieving a user profile for the user, wherein the user profile provides a credential for the user, and receiving a search string. The method includes determining a first search input for searching the data exchange based on the search string and the credential, performing, a first comparison of a first search input portion to respective first set of attributes for the plurality of asset types, and performing a second comparison of a second search input portion to respective second set of attributes for the plurality of asset types. The method includes generating for display a search result for the search string based on the first comparison and the second comparison.

20 Claims, 4 Drawing Sheets

(56) References Cited

U.S. PATENT DOCUMENTS

| | | | |
|---|---|---|---|
| 11,630,829 B1* | 4/2023 | Thunuguntla | G06F 16/24575 |
| | | | 707/723 |
| 2007/0260620 A1* | 11/2007 | Smolen | G06F 16/2308 |
| 2007/0260621 A1* | 11/2007 | Smolen | G06F 16/2308 |
| 2008/0005194 A1* | 1/2008 | Smolen | G06F 16/2308 |
| 2008/0140609 A1* | 6/2008 | Werner | G06F 16/25 |
| 2010/0293163 A1* | 11/2010 | McLachlan | G06N 5/04 |
| | | | 707/769 |
| 2011/0137934 A1* | 6/2011 | Pizzorni | H04L 67/34 |
| | | | 709/219 |
| 2011/0137935 A1* | 6/2011 | Bobick | H04L 63/08 |
| | | | 707/769 |
| 2013/0198221 A1* | 8/2013 | Roark | G06F 16/93 |
| | | | 707/769 |
| 2013/0198226 A1* | 8/2013 | Dhuse | G06F 11/08 |
| | | | 707/769 |
| 2013/0262505 A1* | 10/2013 | Buckley | G06F 16/583 |
| | | | 707/769 |
| 2017/0286456 A1* | 10/2017 | Wenzel | G16H 10/20 |
| 2017/0357730 A1* | 12/2017 | Bullis | G06F 16/3323 |
| 2018/0121433 A1* | 5/2018 | Nevrekar | G06F 16/2455 |
| 2019/0310977 A1* | 10/2019 | Pal | G06F 16/2455 |
| 2021/0397609 A1* | 12/2021 | Yurtsev | G06F 16/24573 |

\* cited by examiner

Data Exchange 200

Asset 210

220

| Data Attribute | Attribute Type |
|---|---|
| Asset Name | String |
| Asset Owner | String |
| Business Unit | String |
| Asset Description | String |
| Asset Unique Identifier | Integer/String |

230

| Data Attribute | Attribute Type |
|---|---|
| Specific Asset Type Identifier | Integer/String |
| Asset Private Data | Various |
| Asset Public Data | Various |
| Asset Function 1 | Function |
| Asset Function 2 | Function |
| Asset Function 3 | Function |
| Asset Function 4 | Function |

FIG. 2

METHODS AND SYSTEMS FOR SEARCHING DATA EXCHANGES THAT COMPRISE INFORMATION ON ASSETS WITH NON-HOMOGENOUS FUNCTIONALITY AND NON-STANDARDIZED DATA DESCRIPTIONS

BACKGROUND

As the world increasingly moves towards the use of electronic storage as the predominant storage method, the amount and type of data in storage continues to expand. To manage this data, some systems rely on a data exchange. A data exchange may facilitate the process of sending, storing, and searching data.

SUMMARY

Data exchanges hold vast amounts of data in many different formats and platforms and conventional searching mechanism are ill equipped to facilitate these searches. For example, to describe the assets on these exchanges, conventional system may allow users to enter a series of attributes in predetermined categories. However, as the functionality and specialization of assets increases, both in number and complexity, the effectiveness of searching based on these predetermined categories decreases. For example, conventional categories such as "creation date" or "creator" do not provide insight into the functions of the asset.

Moreover, even descriptions of functional characteristics (e.g., operating systems used, API capabilities, etc.) do not allow a user to adequately search because many functional characteristics may be shared by the same assets and lead to a deluge of return search results that do not correspond to the goal of the user. Thus, conventional approaches to the aforementioned problems such as adding a catch-all or "other" category are not effective.

To further compound the problems faced by users searching a data exchange, the terminology used by one user may differ from that of another user. For example, one user (e.g., a user with coding background) may enter search strings that include terms corresponding to how an asset is coded. In contrast, another user (e.g., a user with a system architecture background) may enter search strings that include terms corresponding to where the asset is situated in the system architecture. Despite these two users searching for the same asset, they may not be able to locate the asset due to their use of different terminology.

To overcome these technical hurdles, the system enables searching data exchanges that comprise information on assets with non-homogenous functionality and non-standardized data descriptions. More specifically, the system does so by customizing the search string based on the credentials of the users and the asset types the user is likely to be searching for. For example, the system may determine which attributes should be searched based on the first credentials as well as adjusting a portion of an inputted search string based on a likely intent of the user. Moreover, as opposed to conventional searching techniques, the system may parse a search input (e.g., an alphanumeric text string representing search criteria) generated based on search strings (e.g., corresponding different keywords, menu selections, filter criteria, etc.) into individual portions based on whether or not a portion of the search input corresponds to asset descriptions that are standardized throughout the data exchange. The identified portions of the search input may then be modified and/or formatted based on whether or not the portions correspond to asset types with standardized schemas to tailor the search to the likely intent of the user.

For each asset type, a schema (e.g., a JSON schema) is registered to define the structure (e.g., names, types, formats, attribute-level schemas (if needed), validations, and the like) of custom attributes stored/managed by the data exchange. An asset-type's schema defines custom attributes (values and data) and a format for the custom attributes for use in a variety of functions of the data exchange, such as search functionality (e.g., an asset instance (at runtime) may have a custom attribute (e.g., field, data structure) that is assigned/has/contains values and data). Using the registered asset-type schema, custom attributes of assets can be selected for indexing for search functionality of the data exchange. For example, a configuration can be defined for the data exchange to specify how the custom attributes in an asset type's schema are mapped to the search index. Examples of various configurations can include which custom attributes are indexed, aggregating values from multiple fields into a single search field, transforming or enriching the values of certain field values, crawling for & indexing additional content useful for search based on the links in the value of a custom attribute, and customizing the weightage for fields to tune the relevance of search results.

The asset-type schema and the search configuration registered for an asset type are loaded into memory for faster processing of asset management requests. When an asset instance of a given asset type is created or updated, the structure of custom attributes are validated against the registered asset-type schema to ensure that the data remains consistent across asset instances of that type. In addition, the rules in the asset-type search configuration are applied when adding the asset instance's data to the search index.

One example of a rule is a rule that transforms the asset instance's data structure when adding it to the search index. For example, an asset schema can have two fields, A and B, and one search rule in the configuration specifies that the values of A and B be combined or aggregated and mapped to a field, C, for indexing. Users can then use the name of the field, C (e.g., in an advanced query), to search for exact or partial matches to the values of A and B.

In some aspects, methods and systems are designed to search data exchanges that comprise information on assets with non-homogenous functionality and non-standardized data descriptions using credentials corresponding to users conducting searches. The method can include receiving, from a first user, a request to access a data exchange, wherein the data exchange comprises a plurality of asset types, wherein each of the plurality of asset types comprises a first set of attributes and a second set of attributes, wherein the first set of attributes each comprise a standardized schema, and wherein the second set of attributes each comprise a schema specific to a respective asset type of the plurality of asset types; retrieving a user profile for the first user, wherein the user profile provides a first credential for the first user; and receiving, from the first user, a first search string. The method can also include determining a first search input for searching the data exchange based on the first search string and the first credential, wherein the first search input includes a first search input portion that is generated using a standardized process for all credentials and a second input portion that is generated using a process selected based on the first credential; performing, based on the standardized schema, a first comparison of the first search input portion to respective first set of attributes for the plurality of asset types; performing, based on a schema specific to the respective asset type of the plurality of asset types, a second comparison of the second search input portion to respective second set of attributes for the plurality of asset types; and generating for display, on a user interface, a search result for the first search string based on the first comparison and the second comparison.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise.

BRIEF DESCRIPTION OF THE DRAWINGS

FIG. 2 shows illustrative architecture for a data exchange, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
FIG. 1 shows an illustrative user interface for searching data exchanges that comprise information on assets with non-homogenous functionality and non-standardized data descriptions, in accordance with one or more embodiments.

FIG. 1 shows an illustrative user interface for searching one or more data exchanges, in accordance with one or more embodiments. For example, the system generates user interface 100 in response to a user request to initiate a search of one or more data exchanges, such as a user selecting a search function in a software application, the user accessing a web-page for searching one or more data exchanges, the user requesting a search using a voice command, and other means for requesting search functionality for one or more data exchanges.

When the system receives a user request access to user interface 100, the system accesses the user's credentials from a profile associated with the user. For example, when the system receives a request from the user to access user interface 100, the system accesses the profile of the user stored in a data storage location to obtain credentials associated with the user. Credentials associated with the user may include a user name, a user role, a user business unit, a list of user team memberships, a user organization, a search history associated with the user, and other similar credentials.

User interface 100 includes search text input field 105, initiate search input mechanism 110, additional search criteria input mechanism 115, and results display element 120. In some embodiments, user interface 100 may also include other user interface elements, such as additional text boxes, additional fields, additional input mechanisms, and other elements. Search text input field 105 receives input from a user, and the system receives the input from search text input field 105. The system may then use the received input as a search string. The system may receive a manual user input to search text input field 105, for example, by receiving a manual input from a user using a mouse and keyboard to select search text input field 105 and enter a text string into search text input field 105. In other embodiments, the system can populate search text input field 105 automatically, such as populating search text input field 105 with a search string in response to a user selecting a specific hyperlink or user interface element, in response to receiving a voice command from the user, or in response to receiving another form of automatic input to search text input field 105.

Initiate search input mechanism 110 may be a selectable user interface element. When the system receives a selection of initiate search input mechanism, the system may initiate a search of the data exchanges based on a received search string, such as a search string received by the system as input into search text input field 105. In some embodiments, initiate search input mechanism 105 can be a manually-selectable button or other similar user interface element. In some embodiments, the system may receive an automatic actuation of initiate search input mechanism 105, such as detecting a user actuating a particular key on a keyboard, selecting initiate search input mechanism 110 on a touch screen or other human-machine interface, in response to receiving a voice command from the user, and other suitable automatic actuation methods.

Additional search criteria input mechanism 115 can be a manually-selectable input mechanism, such as a button. The system may receive an actuation of the additional search criteria input mechanism 115 and, in response, may generate for display a new user window or dialog box, a new view in user interface 100, a new tab in user interface 100, or another suitable graphical user interface presentation element. The newly displayed graphical user interface presentation element can include additional fields or other user interface elements. The system may receive input from the user at the additional fields or other user interface elements and modify the search based on the received input, such as limiting the search to a particular data exchange or subsection of the data exchange, limiting the search to particular types of digital assets, specifying specific business units or digital asset authors to search, and other filters or refining factors for the search.

Results display element 120 may display returned search results. For example, the system may perform a search and receive, from the data exchange, a list of search results matching the search string. The system may then provide the list of search results to the results display element 120 for display. In some embodiments, results display element 120 may display the most relevant search results at the top of a list of returned search results. In some embodiments, the system may receive a selection of one or more displayed search results (e.g., may receive a manual selection in response to a user clicking on one of the displayed search results). In response to receiving the selection of the one or more displayed search results, the system may provide additional details about the selected one or more displayed search results, such as asset owner, one or more pieces of asset functionality, asset data, asset type, and other additional details, to results display element 120 for display.

FIG. 2 shows illustrative architecture for data exchange 200, in accordance with one or more embodiments. A data exchange is a service that enables users to search and access various digital assets and data associated with digital assets. For example, data exchange 200 includes one or more digital assets, such as digital asset 210. Digital asset 210 may represent various software interfaces that allow users to quickly access data and specific functionality associated with that data, especially in computing systems that have large amounts of data with which to work, such as data lakes. Examples of digital assets can include application programming interfaces ("APIs"), data workflows, data protocols, software applications, and other suitable software interfaces.

Each digital asset has a unique asset type associated with the digital asset. For example, even though two digital assets may both be APIs or data protocols, the digital assets may access completely different data and perform completely different functionality, such as an API for accessing weather data and an API for accessing location data. These two assets would have two different and unique asset types, even if both assets are APIs. Data exchange 200 contains a plurality of different asset types, each digital asset type having its own functionality.

Each digital asset 210 includes two sets of attributes. First set of attributes 220 is a standardized schema that is universal to all types of digital assets. A schema is a formal definition of the structure of stored data in a database. A schema can include data attributes, data types of attributes, fields, data formats for each attribute or field, relationships between data, and other properties that provide structure or functionality to data stored in a database. The standardized schema is a schema that is associated with every type of digital asset created and stored in the data exchange. For example, every digital asset, regardless if the asset is an API, a data workflow, a data protocol, or other software interface, may include a standard set of data attributes such as asset name, asset owner, asset business unit, asset identifier, and other suitable attributes, along with a data type of each of the data attributes. For example, an asset name data attribute may have a data type of string, while an asset identifier data attribute may have a data type of integer, string, hash code, or another data type that can be used to create a unique identifier for the data attribute. In some embodiments, the data type of each data attribute may be a mixed data type (e.g., both a string and integer) or may accept multiple data types for the data attribute.

The standardized schema may also define a data format for each data attribute. For example, for an asset business unit data attribute, the data format may be "BUSINESS UNIT NAME—BUSINESS UNIT ID NUMBER." When a new digital asset is created, the system may prompt a creator of the new digital asset for this information and receive a user input indicating the name of the business unit associated with the new digital asset and an identification number associated with the business unit associated with the new digital asset.

The standardized schema may also define one or more relationships between data attributes or relationships between the digital asset and one or more other data objects. Relationships between data attributes may govern what values can be used to populate a data attribute based on the value of a different data attribute, what data attributes are publicly accessible or not publicly accessible based on the value of a particular data attribute, what data formats may be available for particular attributes based on the value of a different data attribute, and other similar functionality. For example, if a digital asset has an asset creator data attribute with the value "John Smith," a relationship between the asset creator data attribute and an asset business unit data attribute may require that the asset business unit data attribute must have a value of a business unit John Smith works in, such as "software applications." This information may be obtained by the system from a separate database, such as a database storing information about employees in a company utilizing data exchange 200.

Relationships between the digital asset and one or more other data objects may govern a number of data objects that can access data managed by the digital asset, types of data objects that can access data managed by the digital asset, required values of attributes of data objects that request to access the data managed by the digital asset, and other similar functionality. For example, a relationship between the digital asset and another data object may require that the other data object have a value of an asset business number attribute be the same value as a value of the asset business number attribute of the digital asset before allowing access to the digital asset. The system receives the request to access the digital asset from the other data object, determines if the other data object can access the digital asset, and allows or denies access based on the comparison.

Second set of attributes 230 include a schema specific to that unique asset type. Like the standardized schema described above, the specific schema provides a formal definition for the structure of the data. However, the system receives a manual definition of the specific schema from the user for the asset type that is being created. The specific schema may include data attributes, data types of attributes, fields, data formats for each attribute or field, relationships between data, and other properties that provide structure or functionality to data stored in a database for the unique asset type. In contrast to the standardized schema that is universal to all asset types, the specific schema is defined by the creator and includes unique data attributes and functionality associated with the digital asset type. For example, a digital asset for accessing and using weather data may have a specific schema with data attributes such as requested location for weather data, requested timeframe for weather data, requested type(s) of weather data, and other weather data-specific data attributes. The specific schema may also define the functionality of the digital asset, such as providing a requestor functions for requesting weather data for a particular location, timeframe, and similar parameters.

As described above, these unique properties of the specific schema are defined by a creator of the digital asset during the creation process and are not shared between all asset types. Instead, these properties are unique to the asset type being created. By defining a specific schema for each asset type, creators of assets may create custom, non-homogenous functionality for each asset type while maintaining a shared set of common attributes (the standardized schema), which aids in searching the data exchange for different asset types.

The system receives a request to create a new digital asset from the user. In some embodiments, the request may include values and functionality defined by the user for the new digital asset, such as values for data attributes of the standardized schema, values for data attributes of the specific schema and functionality associated with the specific schema, and the like. In some embodiments, the system may generate for presentation an asset creation user interface. The user may input values for data attributes of the standardized schema into fields of the asset creation user interface. The user may also input the specific schema and associated data attributes and functionality into the asset creation user interface. For example, the user may input the asset name and asset business unit into fields of the asset creation user interface and then use one or more input mechanisms to select data attributes, data types of the data attributes, functionality for the asset, values for the data attributes, and other properties of the digital asset. The system may then receive the user inputs and generate a new digital asset for storage in data exchange 200 based on the user inputs.

Figure 3:
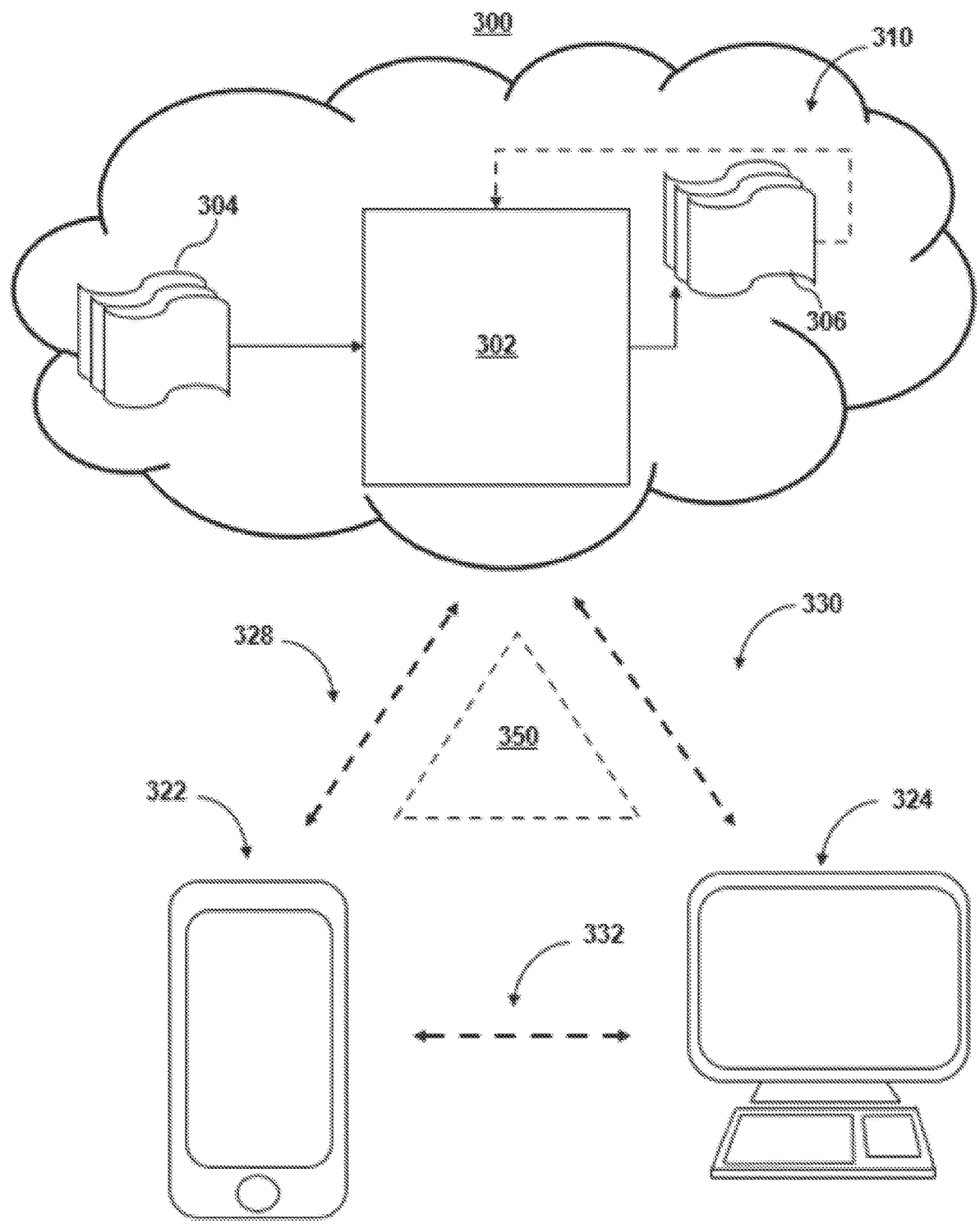
FIG. 3 shows illustrative system components for a data exchange, in accordance with one or more embodiments.

FIG. 3 shows illustrative system components for searching a data exchange for information on assets with non-homogenous functionality and non-standardized data descriptions using credentials corresponding to users conducting searches, in accordance with one or more embodiments. For example, system may represent the components used for searching a data exchange, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users, may, for instance, utilize one or more devices to interact with one another, one or more servers, or other components of system 300. It should be noted that while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to searching a data exchange.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, one or more search queries input by the user, one or more digital assets owned by or associated with the user, one or more digital assets previously accessed by the user, or other information related to the user's access of the data exchange. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based I/O circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302.

In some embodiments, model 302 may predict one or more search terms. Search terms may include one or more words, phrases, values, or other portions of search strings that are used in a search process. For example, the system may determine that particular characteristics are more likely to be indicative of a particular search term or search string. In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a recommendation of search terms and the like.

System 300 also includes API layer 350. API layer 350 may allow the system to generate recommendations across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use developer portal. API layer 350 may use strong security constraints applying WAF and DDoS protection, and API layer 350 may use RESTful APIs as standard for external integration.

Figure 4:
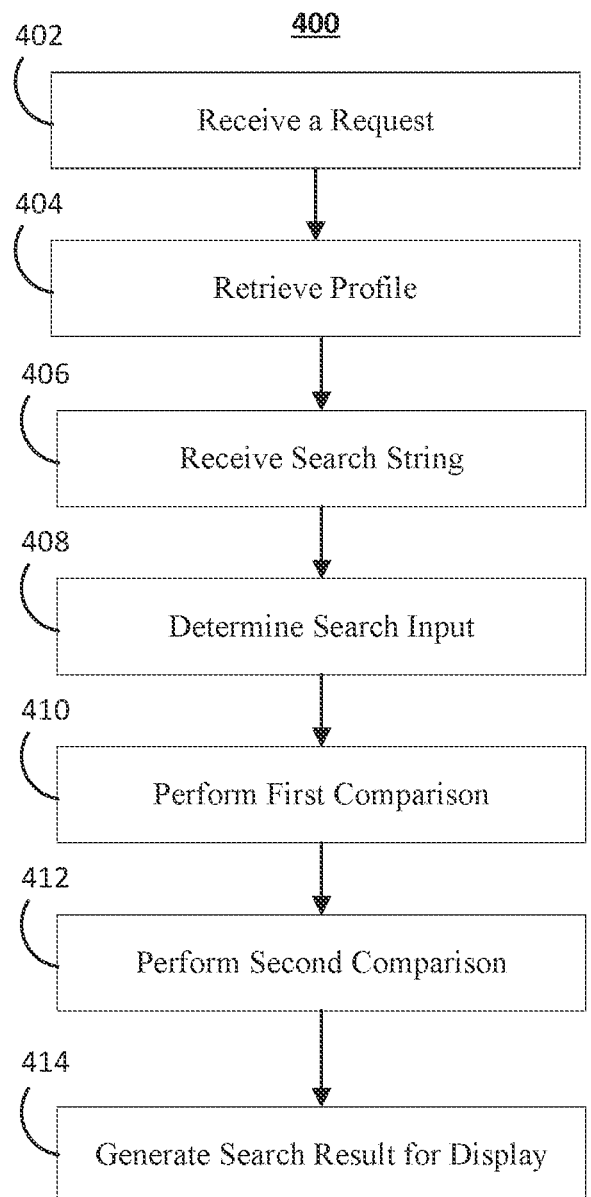
FIG. 4 shows a flowchart of the steps involved in searching data exchanges that comprise information on assets with non-homogenous functionality and non-standardized data descriptions, in accordance with one or more embodiments.

FIG. 4 shows a flow chart of the steps for searching data exchanges for information on assets, in accordance with one or more embodiments. The system may use process 400 (e.g., as implemented on one or more system components) in order to search one or more data exchanges for relevant digital assets to present to the user. The one or more data exchanges comprise information on digital assets with non-homogenous functionality and non-standardized data descriptions using credentials corresponding to users conducting searches. Each of the data comprises a plurality of asset types, each of the plurality of asset types comprising a first set of attributes and a second set of attributes. The first set of attributes comprise a standardized schema shared by all asset types, and the second set of attributes comprise a schema specific to a respective asset type of the plurality of asset types.

At step 402, process 400 (e.g., as implemented on one or more system components as described in FIG. 3) receives a request. In some embodiments, the request may be a request from a user to search a data exchange. The request may include one or more request parameters. The request parameters may be parameters for searching the data exchange and may include a user identity, a user credential, a type of asset to search, a particular data exchange to search, or other parameters.

At step 404, process 400 (e.g., as implemented on one or more system components as described in FIG. 3) retrieves a user profile. In some embodiments, the system accesses the user profile based on a credential associated with a requesting user or based on an identity of the requesting user. The system uses the received credential or identity to access a profile stored in memory associated with the user. Process 400 may then access one or more credentials associated with the user, such as a user name, a user business unit, a user team, or another suitable credential. In some embodiments, the system may determine a user role. As described below with regards to step 408, the user role may be compared to a database listing roles likely to access each of the plurality of asset types to filter the plurality of asset types based on the user role.

In some embodiments, the system may use the one the one or more credentials to determine a user authorization level. Like the user role, the user authorization level may be compared to a database listing authorization levels corresponding to each of the plurality of asset types to filter the plurality of asset types based on the authorization.

In some embodiments, the system may use the one or more credentials to determine one or more attributes to search for. For example, certain user credentials may modify the search to only search within a business unit associated with the user, a team associated with the user, an organization associated with the user, and other modifications for a search.

In some embodiments, the system may use the one or more credential to determine an asset terminology identifier that is associated with the user. For example, if a user is associated with a particular business unit or a particular organization, the user may use certain terminology while another user in a different business unit or organization may use different terminology. Based on the credential, the system may modify the search or filter the search to use a set of asset terminology terms and phrases. Based on the set of asset terminology, the system may select digital assets as search results with familiar terminologies to the user or search attributes of digital assets that include the asset terminology the user is most likely to be familiar with. The system may input the asset terminology identifier into a database listing terminology for users with the credential corresponding to attributes for the plurality of asset types to determine a modification to the second search input portion. The system may then modify the second search input based on the modification prior to the second comparison At step 406, process 400 (e.g., as implemented on one or more system components as described in FIG. 3) receives a search string. In some embodiments, the system receives the search string from a user, such as being received based on a user input to the system. In some embodiments, the user manually inputs the search string into a user interface, and the system receives the search string from the user interface. In other embodiments, the system may receive the search string based on a selection of a link by the user, a voice command stated by the user, and other automatic input methods.

At step 408, process 400 (e.g., as implemented on one or more system components as described in FIG. 3) determines a search input. In some embodiments, the search input is one or more words, phrases, values, or other search terms for searching the data exchange. In some embodiments, the system determines the search input based on the search string and the user credential. The search input includes a first search input portion and a second input portion. The system generates the first input portion based on the standardized schema and using a standardized process applicable to all asset types and all user credential types. For example, the system may generate the first search input portion using the standardized process for all asset types and user credentials. The first search input portion is used to aid in searching the data exchange for relevant search results based on properties associated with the standardized schema associated with every asset type stored in the data exchange. For example, the first input portion can include one or more search terms. The system may generate the second input portion using a process specific to the determined user credential, such as generating the second portion based on a user business unit, a user role, a user authorization level, and other user-specific credentials.

In some embodiments, the search input may be further determined based on an output of a model. For example, the system may provide the search string to a model for predicting search terms string as input. The model may process the search string to predict one or more search terms that may return the most relevant results for the search. The model may then output the predicted search terms for use by the system in generating a search input. In some embodiments, the model may also access the user profile to determine one or more characteristics about the user, such as user name, user business unit, user search history, and other characteristics. The model may process the user characteristics and output relevant search terms for use in generating the search input.

In some embodiments, the process used to generate the second input portion includes determining a respective asset type identifier for each of the plurality of asset types stored in the data exchange. The system may input the respective asset type identifier into a database listing schemas corresponding to asset type identifiers to determine a respective set of database objects for each of the plurality of asset types. The schema may include these database objects, which is a unique combination of objects for the asset type.

In some embodiments, the process used to generate the second input portion further includes determining a modification to the second search input portion based on the respective set of database objects and applying the modification to the second search input portion prior to the second comparison. The system may make modifications to the second search input portion based on the database objects associated with a particular schema, which aids in identifying assets the user is most likely searching for.

At step 410, process 400 (e.g., as implemented on one or more system components as described in FIG. 3) performs a first comparison. The system may perform the first comparison by comparing the first search input portion to a first set of attributes. The system performs the first comparison based on the standardized schema for all digital assets. The first comparison includes a comparison of the first search input portion to a first set of attributes for the plurality of asset types. In some embodiments, the first set of attributes includes the standardized schema of attributes that is shared among all digital asset types stored in the data exchange. Values of the first attributes from at least a portion of the digital assets stored in the data exchange are compared to the first search input portion to determine if a particular asset of the stored digital assets is a relevant search result for the search request.

At step 412, process 400 (e.g., as implemented on one or more system components as described in FIG. 3) performs a second comparison. The system may perform the second comparison by comparing the second search input portion to a second set of attributes. The system performs the second comparison on a schema specific to a respective asset type of the plurality of asset types. The second comparison includes a comparison of the second search input portion to respective second set of attributes for the plurality of asset types. For example, based on the user-specific credential, one or more values from a set of attributes specific to each asset type may be compared to the second input portion to determine if a particular asset has unique or specific attributes that may be a match for the user's search.

In some embodiments, the second comparison may include determining a data type for the schema specific to an asset type of the plurality of asset types and formatting the second search input portion based on the first data type to generate a first formatted search input portion. Data types may include strings, integers, Booleans, enumerated data, and other data types. The first formatted search input portion may be compared to a first value of a first attribute of the second set of attributes for the first asset type. The second comparison may also include determining a second data type for the schema specific to a second asset type of the plurality of asset types, formatting the second search input portion based on the second data type to generate a second formatted search input portion, and comparing the second formatted search input portion to a first value of a second attribute of the second set of attributes for the second asset type. In this way, the second search input portion may be uniquely formatted for each given asset type in the data exchange.

In some embodiments, different attributes may be selected for the first set of attributes and the second set of attributes based on the credential. For example, the system may determine which attributes are included in the first and second set based on the credentials of the user. For example, a first set of attributes may be the same for all software programmers, but the attributes in this first set may be different than the attributes in the first set for the cybersecurity team.

At step 414, process 400 (e.g., as implemented on one or more system components as described in FIG. 3) generates a search result. The system may generate the search result for display to the user. The system may generate the search results based on the first comparison and the second comparison. When the system generates the search results a list of search results is generated and returned by the system. In some embodiments, the system returns the search results to a user interface for display to the user. In other embodiments, the system returns the search result to a separate computing system. In some embodiments, the system may prioritize or rank individual search results of the generated search results based on the first comparison and the second comparison. For example, the system may determine a relevancy score for each individual search result based on the first comparison, the second comparison, or both the first comparison and the second comparison. The relevancy score may indicate how relevant to the search string or the search input the individual search result is. For example, the system may determine a relevancy score between 0 and 100, where relevancy scores closer to 0 indicate less relevant search results and relevancy scores closer to 100 indicate more relevant search results. The system may then determine a ranking or listing of the search results based on the relevancy scores of each individual search result, such as ranking the list in order from most relevant search result to least relevant search result. In other embodiments, the system may compare the relevancy score to a threshold relevancy score. For example, a threshold relevancy score may be 75. If the relevancy scores of individual search results exceed the threshold relevancy score (e.g., exceed a value of 75), the individual search result associated with the relevancy score can be included in the list of search results. If the relevancy score of the individual search result does not exceed the threshold relevancy score, the individual search result will not be included in the returned search results It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-3 could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for searching data exchanges that comprise information on assets with non-homogenous functionality and non-standardized data descriptions using credentials corresponding to users conducting searches, the method comprising: receiving, from a first user, a request to access a data exchange, wherein the data exchange comprises a plurality of asset types, wherein each of the plurality of asset types comprises a first set of attributes and a second set of attributes, wherein the first set of attributes each comprise a standardized schema, and wherein the second set of attributes each comprise a schemas specific to a respective asset type of the plurality of asset types;

retrieving a user profile for the first user, wherein the user profile provides a first credential for the first user;

receiving, from the first user, a first search string;

determining a first search input for searching the data exchange based on the first search string and the first credential, wherein the first search input includes a first search input portion that is generated using a standardized process for all credentials and a second input portion that is generated using a process selected based on the first credential;

performing, based on the standardized schema, a first comparison of the first search input portion to respective first set of attributes for the plurality of asset types;

performing, based on a schema specific to the respective asset type of the plurality of asset types, a second comparison of the second search input portion to respective second set of attributes for the plurality of asset types; and generating for display, on a user interface, a search result for the first search string based on the first comparison and the second comparison.

2. The method of embodiment 1, wherein performing, based on the schema specific to the respective asset type of the plurality of asset types, a second comparison of the second search input portion to respective second set of attributes for the plurality of asset types comprises:

determining a first data type for the schema specific to a first asset type of the plurality of asset types;

formatting the second search input portion based on the first data type to generate a first formatted search input portion;

comparing the first formatted search input portion to a first value of a first attribute of the second set of attributes for the first asset type;

determining a second data type for the schema specific to a second asset type of the plurality of asset types;

formatting the second search input portion based on the second data type to generate a second formatted search input portion; and comparing the second formatted search input portion to a first value of a second attribute of the second set of attributes for the second asset type.

3. The method of either of embodiments 1 or 2, wherein the process used to generate the second input portion comprises: determining a respective asset type identifier for each of the plurality of asset types; and inputting the respective asset type identifier into a database listing schemas corresponding to asset type identifiers to determine a respective set of database objects for each of the plurality of asset types.

4. The method of embodiment 3, wherein the process used to generate the second input portion further comprises: determining a modification to the second search input portion based on the respective set of database objects; and applying the modification to the second search input portion prior to the second comparison.

5. The method of any of embodiments 1-4, wherein the first search input is further determined based on an output of a model used for predicting one or more search terms, and wherein the model is updated based on the search result.

6. The method of any of embodiments 1-5, wherein the process used to generate the second input portion comprises: determining an asset terminology identifier based on the first credential; comparing the asset terminology identifier to a database listing terminology for users with the first credential corresponding to attributes for the plurality of asset types to determine a modification to the second search input portion; and applying the modification to the second search input portion prior to the second comparison.

7. The method of any of embodiments 1-6, further comprising: determining a first authorization level for first user based on the first credential; and comparing the first authorization level to a database listing authorization levels corresponding to each of the plurality of asset types to filter the plurality of asset types based on the first authorization level.

8. The method of any of embodiments 1-7, further comprising: determining a first role for first user based on the first credential; and comparing the first role to a database listing roles likely to access each of the plurality of asset types to filter the plurality of asset types based on the first role.

9. The method of any of embodiments 1-8, further comprising: determining a first set of attributes for performing the first comparison based on the first credential; and determining a second set of attributes for performing the second comparison based on the first credential.

10. The method of any of embodiments 1-9, further comprising: determining a first attribute set identifier based on the first credential; and comparing the first attribute set identifier to a database listing attribute sets corresponding to first attribute set identifier to determine the first set of attributes for performing the first comparison.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for searching data exchanges that comprise information on assets with non-homogenous functionality and non-standardized data descriptions using credentials corresponding to users conducting searches, the system comprising:

storage circuitry configured to store:
a data exchange, wherein the data exchange comprises a plurality of asset types, wherein each of the plurality of asset types comprises a first set of attributes and a second set of attributes, wherein the first set of attributes each comprise a standardized schema, and wherein the second set of attributes each comprise a schemas specific to a respective asset type of the plurality of asset types; and
a database listing terminology for users with the first credential corresponding to attributes for the plurality of asset types;

control circuitry configured to:
receive, from a first user, a request to access the data exchange;
retrieve a user profile for the first user, wherein the user profile provides a first credential for the first user;
receive, from the first user, a plurality of selections into a menu for searching the data exchange;
generate a first search string based on the plurality of selections;
determine a first search input for searching the data exchange based on the first search string and the first credential, wherein the first search input includes a first search input portion that is generated using a standardized process for all credentials and a second input portion that is generated using a process selected based on the first credential, wherein the process used to generate the second input portion comprises:
determining an asset terminology identifier based on the first credential;

comparing the asset terminology identifier to the database to determine a modification to the second search input portion; and
applying the modification to the second search input portion;
perform, based on the standardized schema, a first comparison of the first search input portion to respective first set of attributes for the plurality of asset types;
perform, based on a schema specific to the respective asset type of the plurality of asset types, a second comparison of the second search input portion to respective second set of attributes for the plurality of asset types; and
input/output circuitry configured to generate for display, on a user interface, a search result for the first search string based on the first comparison and the second comparison.

2. A method for searching data exchanges that comprise information on assets with non-homogenous functionality and non-standardized data descriptions using credentials corresponding to users conducting searches, the method comprising:
receiving, from a first user, a request to access a data exchange, wherein the data exchange comprises a plurality of asset types, wherein each of the plurality of asset types comprises a first set of attributes and a second set of attributes, wherein the first set of attributes each comprise a standardized schema, and wherein the second set of attributes each comprise a schemas specific to a respective asset type of the plurality of asset types;
retrieving a user profile for the first user, wherein the user profile provides a first credential for the first user;
receiving, from the first user, a first search string;
determining a first search input for searching the data exchange based on the first search string and the first credential, wherein the first search input includes a first search input portion that is generated using a standardized process for all credentials and a second input portion that is generated using a process selected based on the first credential;
performing, based on the standardized schema, a first comparison of the first search input portion to respective first set of attributes for the plurality of asset types;
performing, based on a schema specific to the respective asset type of the plurality of asset types, a second comparison of the second search input portion to respective second set of attributes for the plurality of asset types; and
generating for display, on a user interface, a search result for the first search string based on the first comparison and the second comparison.

3. The method of claim 2, wherein performing, based on the schema specific to the respective asset type of the plurality of asset types, a second comparison of the second search input portion to respective second set of attributes for the plurality of asset types comprises:
determining a first data type for the schema specific to a first asset type of the plurality of asset types;
formatting the second search input portion based on the first data type to generate a first formatted search input portion;
comparing the first formatted search input portion to a first value of a first attribute of the second set of attributes for the first asset type;
determining a second data type for the schema specific to a second asset type of the plurality of asset types;
formatting the second search input portion based on the second data type to generate a second formatted search input portion; and
comparing the second formatted search input portion to a first value of a second attribute of the second set of attributes for the second asset type.

4. The method of claim 2, wherein the process used to generate the second input portion comprises:
determining a respective asset type identifier for each of the plurality of asset types; and
inputting the respective asset type identifier into a database listing schemas corresponding to asset type identifiers to determine a respective set of database objects for each of the plurality of asset types.

5. The method of claim 4, wherein the process used to generate the second input portion further comprises:
determining a modification to the second search input portion based on the respective set of database objects; and
applying the modification to the second search input portion prior to the second comparison.

6. The method of claim 2, wherein the first search input is further determined based on an output of a model used for predicting one or more search terms, and wherein the model is updated based on the search result.

7. The method of claim 2, wherein the process used to generate the second input portion comprises:
determining an asset terminology identifier based on the first credential;
comparing the asset terminology identifier to a database listing terminology for users with the first credential corresponding to attributes for the plurality of asset types to determine a modification to the second search input portion; and
applying the modification to the second search input portion prior to the second comparison.

8. The method of claim 2, further comprising:
determining a first authorization level for first user based on the first credential; and
comparing the first authorization level to a database listing authorization levels corresponding to each of the plurality of asset types to filter the plurality of asset types based on the first authorization level.

9. The method of claim 2, further comprising:
determining a first role for first user based on the first credential; and
comparing the first role to a database listing roles likely to access each of the plurality of asset types to filter the plurality of asset types based on the first role.

10. The method of claim 2, further comprising:
determining a first set of attributes for performing the first comparison based on the first credential; and
determining a second set of attributes for performing the second comparison based on the first credential.

11. The method of claim 2, further comprising:
determining a first attribute set identifier based on the first credential; and
comparing the first attribute set identifier to a database listing attribute sets corresponding to first attribute set identifier to determine the first set of attributes for performing the first comparison.

12. A computer-readable medium comprising a set of instructions that, when executed by one or more processors, cause the one or more processors to execute a method for searching data exchanges that comprise information on assets with non-homogenous functionality and non-standardized data descriptions using credentials corresponding to users conducting searches, the method comprising:

receiving, from a first user, a request to access a data exchange, wherein the data exchange comprises a plurality of asset types, wherein each of the plurality of asset types comprises a first set of attributes and a second set of attributes, wherein the first set of attributes each comprise a standardized schema, and wherein the second set of attributes each comprise a schemas specific to a respective asset type of the plurality of asset types;

retrieving a user profile for the first user, wherein the user profile provides a first credential for the first user;

receiving, from the first user, a first search string;

determining a first search input for searching the data exchange based on the first search string and the first credential, wherein the first search input includes a first search input portion that is generated using a standardized process for all credentials and a second input portion that is generated using a process selected based on the first credential;

performing, based on the standardized schema, a first comparison of the first search input portion to respective first set of attributes for the plurality of asset types;

performing, based on a schema specific to the respective asset type of the plurality of asset types, a second comparison of the second search input portion to respective second set of attributes for the plurality of asset types; and generating for display, on a user interface, a search result for the first search string based on the first comparison and the second comparison.

13. The computer-readable medium of claim 12, wherein performing, based on a schema specific to the respective asset type of the plurality of asset types, a second comparison of the second search input portion to respective second set of attributes for the plurality of asset types comprises:

determining a first data type for the schema specific to a first asset type of the plurality of asset types;

formatting the second search input portion based on the first data type to generate a first formatted search input portion;

comparing the first formatted search input portion to a first value of a first attribute of the second set of attributes for the first asset type;

determining a second data type for the schema specific to a second asset type of the plurality of asset types;

formatting the second search input portion based on the second data type to generate a second formatted search input portion; and comparing the second formatted search input portion to a first value of a second attribute of the second set of attributes for the second asset type.

14. The computer-readable medium of claim 12, wherein the process used to generate the second input portion comprises:

determining a respective asset type identifier for each of the plurality of asset types; and inputting the respective asset type identifier into a database listing schemas corresponding to asset type identifiers to determine a respective set of database objects for each of the plurality of asset types.

15. The computer-readable medium of claim 14, wherein the process used to generate the second input portion further comprises:

determining a modification to the second search input portion based on the respective set of database objects; and applying the modification to the second search input portion prior to the second comparison.

16. The computer-readable medium of claim 12, wherein the first search input is further determined based on an output of a model used for predicting one or more search terms, and wherein the model is updated based on the search results.

17. The computer-readable medium of claim 12, wherein the process used to generate the second input portion comprises:

determining an asset terminology identifier based on the first credential;

comparing the asset terminology identifier to a database listing terminology for users with the first credential corresponding to attributes for the plurality of asset types to determine a modification to the second search input portion; and applying the modification to the second search input portion prior to the second comparison.

18. The computer-readable medium of claim 12, the method further comprising:

determining a first authorization level for first user based on the first credential; and comparing the first authorization level to a database listing authorization levels corresponding to each of the plurality of asset types to filter the plurality of asset types based on the first authorization level.

19. The computer-readable medium of claim 12, the method further comprising:

determining a first role for first user based on the first credential; and comparing the first role to a database listing roles likely to access each of the plurality of asset types to filter the plurality of asset types based on the first role.

20. The computer-readable medium of claim 12, the method further comprising:

determining a first set of attributes for performing the first comparison based on the first credential; and determining a second set of attributes for performing the second comparison based on the first credential.

* * * * *